United States Patent
Narushima (10) Patent No.: US 10,712,617 B2
(45) Date of Patent: Jul. 14, 2020

(54) BACKLIGHT UNIT AND HEAD-UP DISPLAY DEVICE

(71) Applicant: Yazaki Corporation, Tokyo (JP)

(72) Inventor: Noriaki Narushima, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 182 days.

(21) Appl. No.: 16/120,612

(22) Filed: Sep. 4, 2018

(65) Prior Publication Data

US 2019/0072799 A1 Mar. 7, 2019

(30) Foreign Application Priority Data

Sep. 6, 2017 (JP) ................. 2017-170943

(51) Int. Cl.
*G02F 1/13357* (2006.01)
*G02B 27/01* (2006.01)

(52) U.S. Cl.
CPC ......... *G02F 1/13362* (2013.01); *G02B 27/01* (2013.01); *G02B 27/0101* (2013.01); *G02B 27/0149* (2013.01); *G02B 2027/015* (2013.01); *G02F 2201/34* (2013.01)

(58) Field of Classification Search
CPC . G02F 1/13362; G02F 2201/34; G02B 27/01; G02B 27/0101; G02B 27/0149; G02B 2027/015
USPC .................. 359/630, 631; 345/7, 9
See application file for complete search history.

(56) References Cited

U.S. PATENT DOCUMENTS

| 2014/0022645 | A1 | 1/2014 | Matsuura et al. |
| 2017/0299922 | A1* | 10/2017 | Matsuura ............... B60K 35/00 |
| 2018/0210201 | A1* | 7/2018 | Togasaki ........... G02F 1/133528 |

FOREIGN PATENT DOCUMENTS

| JP | 2012203176 A | 10/2012 |
| JP | 2016-65908 A | 4/2016 |
| JP | 2017097074 A | 6/2017 |

* cited by examiner

*Primary Examiner* — William R Alexander
*Assistant Examiner* — Gary W O'Neill
(74) *Attorney, Agent, or Firm* — Sughrue Mion, PLLC (57) ABSTRACT

A backlight unit has a light source, a light collecting member that collects light emitted from the light source, and a micromirror array that has a concave reflecting surface and reflects light entering from the light collecting member toward a liquid crystal panel by the reflecting surface, a polarizing plate that folds back, between the micromirror array and the liquid crystal panel, an optical path of light reflected by the micromirror array toward the liquid crystal panel, and a diffusing plate disposed on an optical path between the polarizing plate and the liquid crystal panel. In the micromirror array, the reflecting surface is composed of a plurality of micromirrors. The polarizing plate transmits light oscillating in a first direction orthogonal to an oscillating direction of light transmitted through the liquid crystal panel and reflects light oscillating in a second direction intersecting the first direction.

4 Claims, 5 Drawing Sheets

BACKLIGHT UNIT AND HEAD-UP DISPLAY DEVICE

CROSS-REFERENCE TO RELATED APPLICATION(S)

The present application claims priority to and incorporates by reference the entire contents of Japanese Patent Application No. 2017-170943 filed in Japan on Sep. 6, 2017.

BACKGROUND OF THE INVENTION

1. Field of the Invention

The present invention relates to a backlight unit and a head-up display device.

2. Description of the Related Art

Conventionally, there is a backlight unit used for a head-up display device or the like. For example, in Japanese Patent Laid-open No. 2016-65908, after light of a light source is converted into parallel light by a parallel light generating means, light of a plurality of light source images is generated from the parallel light by a lens array and collected on a liquid crystal panel via a collecting lens or the like, to reduce luminance unevenness of the liquid crystal panel. Further, in Japanese Patent Laid-open No. 2016-65908, a reflecting portion is disposed on an optical path between the light source and the liquid crystal panel to fold back the optical path, thereby shortening a length of the backlight unit in a depth direction.

In recent years, total luminous flux required with enlargement of a screen of a head-up display device, enlargement of an eye box, and higher luminance of a liquid crystal panel is increased to increase illuminance on a liquid crystal panel, which leaves room for improvement in terms of temperature rise of a liquid crystal panel due to light of a backlight.

SUMMARY OF THE INVENTION

A purpose of the present invention is to provide a backlight unit and a head-up display device capable of suppressing temperature rise of a liquid crystal panel due to illumination light.

According to an aspect of the present invention, a backlight unit includes: at least one light source; a light collecting member that collects light emitted from the light source; an optical member that includes a concave reflecting surface and reflects light entering from the light collecting member toward a light transmissive liquid crystal display element by the reflecting surface; a polarizing plate that is disposed at a position where an optical path between the optical member and the liquid crystal display element is folded back, transmits part of light reflected by the optical member, and reflects the rest of the light toward the liquid crystal display element; and a diffusing plate disposed on an optical path between the polarizing plate and the liquid crystal display element. The reflecting surface of the optical member includes a plurality of micromirrors, each of the micromirrors is a convex or a concave curved surface, and the polarizing plate transmits light oscillating in a first direction orthogonal to an oscillating direction of light transmitted through the liquid crystal display element and reflects light oscillating in a second direction intersecting the first direction.

According to another aspect of the present invention, a backlight unit includes: at least one light source; a light collecting member that collects light emitted from the light source; an optical member that has an entrance surface which light collected by the light collecting member enters and an exit surface which light entering from the entrance surface exits and that transmits light entering from the entrance surface from the exit surface toward a light transmissive liquid crystal display element; a polarizing plate disposed on an optical path between the optical member and the liquid crystal display element; and a diffusing plate disposed on an optical path between the polarizing plate and the liquid crystal display element. The entrance surface and the exit surface of the optical member each include a plurality of microlenses, each of the microlenses has a convex or a concave curved surface, and the polarizing plate reflects light oscillating in a direction intersecting an oscillating direction of light transmitted through the liquid crystal display element and transmits light oscillating in the same direction as the oscillating direction.

According to still another aspect of the present invention, a head-up display device includes: a light transmissive liquid crystal display element; and a backlight unit. The backlight unit includes: at least one light source; a light collecting member that collects light emitted from the light source; an optical member that has a concave reflecting surface and reflects light entering from the light collecting member toward the liquid crystal display element by the reflecting surface; a polarizing plate that is disposed at a position where an optical path between the optical member and the liquid crystal display element is folded back, transmits part of light reflected by the optical member, and reflects the rest of the light toward the liquid crystal display element; and a diffusing plate disposed on an optical path between the polarizing plate and the liquid crystal display element, the reflecting surface of the optical member includes a plurality of micromirrors, each of the micromirrors is a convex or a concave curved surface, and the polarizing plate transmits light oscillating in a first direction orthogonal to an oscillating direction of light transmitted through the liquid crystal display element and reflects light oscillating in a second direction intersecting the first direction.

According to still another aspect of the present invention, a head-up display device includes: a light transmissive liquid crystal display element; and a backlight unit. The backlight unit includes: at least one light source; a light collecting member that collects light emitted from the light source; an optical member that has an entrance surface which light collected by the light collecting member enters and an exit surface which light entering from the entrance surface exits and that transmits light entering from the entrance surface from the exit surface toward a light transmissive liquid crystal display element; a polarizing plate disposed on an optical path between the optical member and the liquid crystal display element; and a diffusing plate disposed on an optical path between the polarizing plate and the liquid crystal display element, the entrance surface and the exit surface of the optical member each include a plurality of microlenses, each of the microlenses has a convex or a concave curved surface, and the polarizing plate reflects light oscillating in a direction intersecting an oscillating direction of light transmitted through the liquid crystal display element and transmits light oscillating in the same direction as the oscillating direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of a backlight unit and a head-up display device according to the present invention will be described in detail with reference to the drawings. The present invention is not limited to this embodiment. Constituent elements in the embodiments below include those which can be easily assumed by those skilled in the art or are substantially identical. In addition, various types of omissions, substitutions, or changes can be made to the constituent elements in the embodiments below without departing from the gist of the invention. Further, configurations described below can be appropriately combined.

First Embodiment

Figure 1:
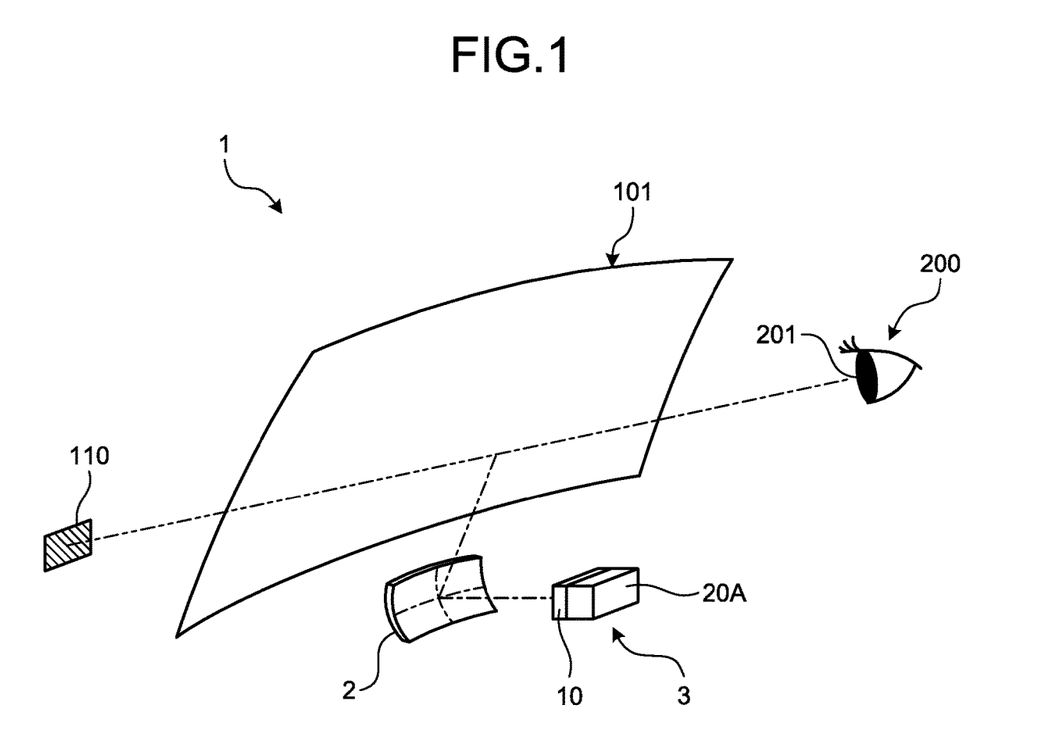
FIG. 1 is a schematic configuration diagram of a head-up display device according to a first embodiment of the present invention.
Figure 2:
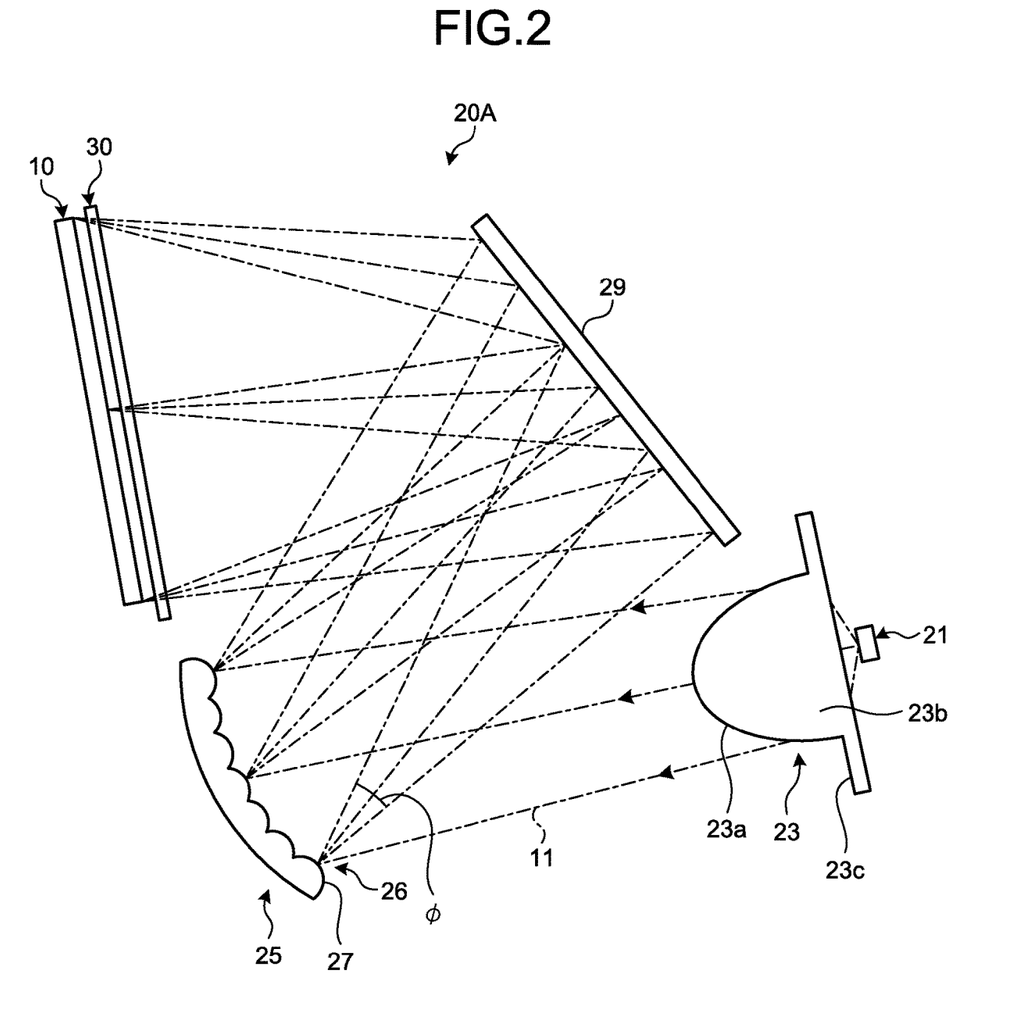
FIG. 2 is a schematic configuration diagram of a backlight unit according to the first embodiment.
Figure 3:
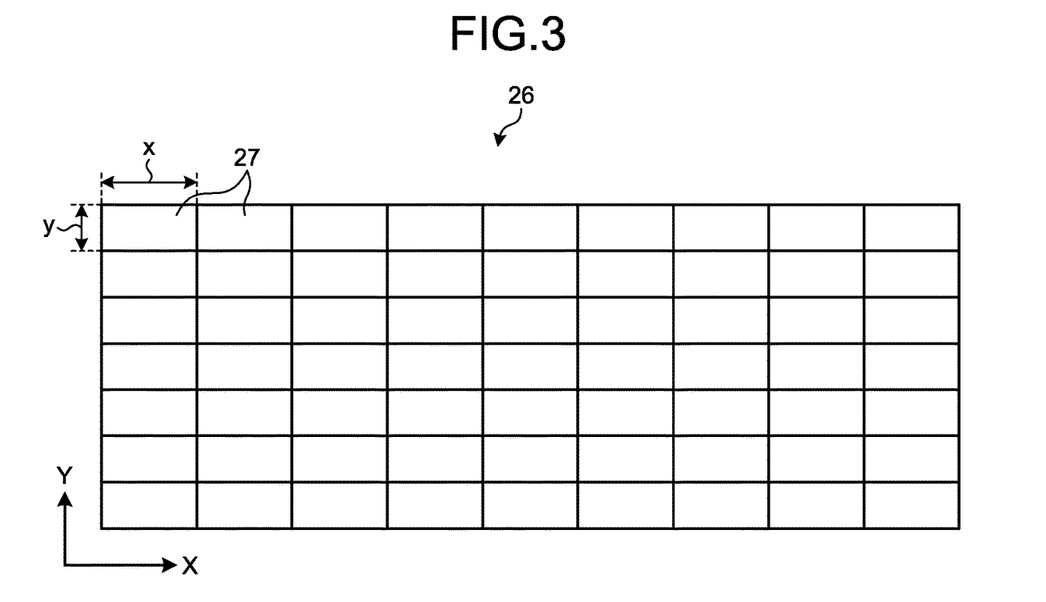
FIG. 3 is a front view of a micromirror array according to the first embodiment.
Figure 4:
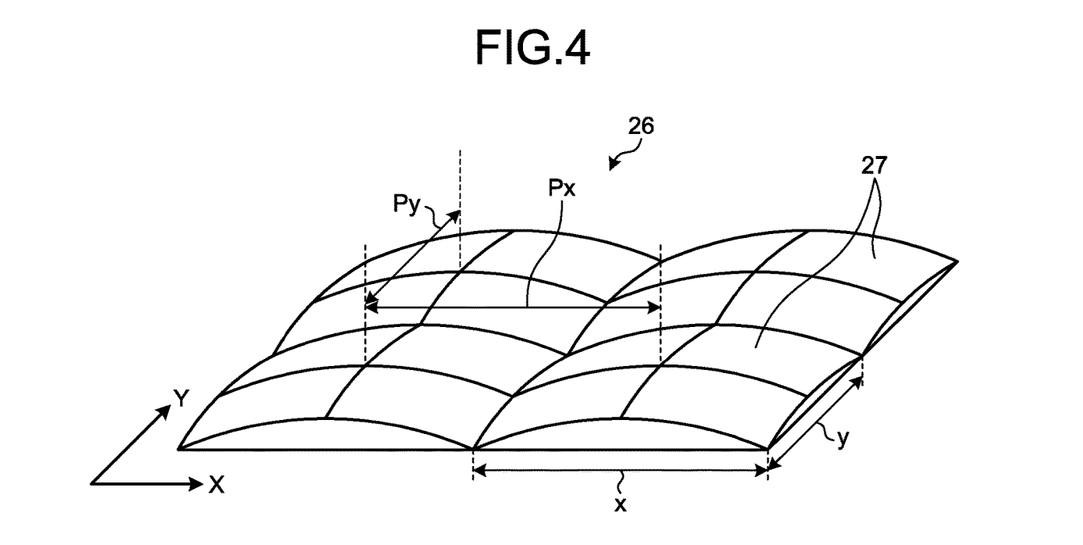
FIG. 4 is a partially enlarged view of the micromirror array according to the first embodiment.
Figure 5:
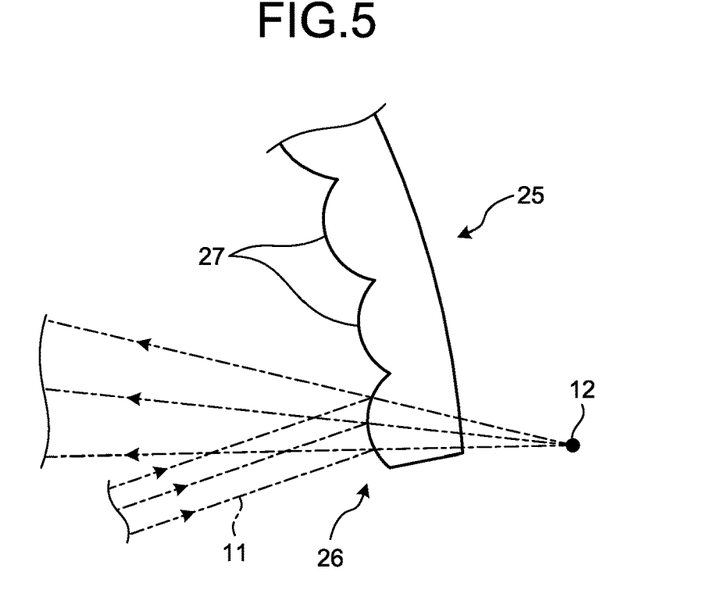
FIG. 5 is a perspective view of a micromirror according to the first embodiment.

FIG. 1 is a schematic configuration diagram of a head-up display device according to a first embodiment. FIG. 2 is a schematic configuration diagram of a backlight unit according to the first embodiment. FIG. 3 is a front view of a micromirror array according to the first embodiment. FIG. 4 is a partially enlarged view of the micromirror array according to the first embodiment. FIG. 5 is a perspective view of a micromirror according to the first embodiment. FIG. 2 (and FIGS. 6 and 7) illustrates positional relationships among elements when the backlight unit is viewed from a side. FIG. 3 is a front view of the micromirror array from a reflecting surface side.

As illustrated in FIG. 1, a head-up display device 1 according to the present embodiment is disposed inside a dashboard (not illustrated) of a vehicle (not illustrated) such as an automobile and projects a display image on a windshield 101. The head-up display device 1 projects a display image on the windshield 101 and displays a virtual image 110 in front of an eye point 201 of a driver 200. The eye point 201 is a predetermined position as a viewpoint position of the driver 200 seated in a driver's seat (not illustrated). The driver 200 recognizes an image reflected by the windshield 101 as the virtual image 110. For the driver 200, the virtual image 110 is recognized in front of the windshield 101. The head-up display device 1 includes a magnifying mirror 2 and a display unit 3. The magnifying mirror 2 reflects display light emitted from the display unit 3 toward the windshield 101. The magnifying mirror 2 is composed of, for example, an aspherical mirror. The display unit 3 emits display light corresponding to a display image. The display unit 3 includes a liquid crystal panel 10 and a backlight unit 20A.

The liquid crystal panel 10 is a liquid crystal display element. The liquid crystal panel 10 is made of, for example, a light transmissive or a semi-transmissive thin film transistor (TFT) liquid crystal display. When the liquid crystal panel 10 is illuminated from a back side, a display surface on a front side emits light. The liquid crystal panel 10 displays a display image including numbers, letters, and figures in response to a control instruction from a control unit (not illustrated) in a vehicle.

The backlight unit 20A irradiates the liquid crystal panel 10 with light from the back side. The backlight unit 20A is driven by DC power obtained from a power source (not illustrated) in a vehicle. As illustrated in FIG. 2, the backlight unit 20A includes a light source 21, a light collecting member 23, a micromirror array 25, a polarizing plate 29, and a diffusing plate 30.

The light source 21 is composed of one light emitting diode (LED). The light source 21 is driven by DC power obtained from a power source in a vehicle. The light source 21 is turned on/off in response to an ON/OFF signal from the control unit. The LED is fixed to, for example, a substrate (not illustrated). A heat sink (not illustrated) may be fixed on a back side of the substrate. The heat sink releases heat accumulated on the substrate to an outside of the backlight unit 20A.

The light collecting member 23 collects light emitted from the light source 21. The light collecting member 23 is a collecting lens made of glass or a transparent resin, for example. The light collecting member 23 is composed of a convex curved lens surface 23a, a lens main body portion 23b having the lens surface 23a, and a flange portion 23c provided along an outer periphery of the lens main body portion 23b.

The micromirror array 25 is an optical member. The micromirror array 25 is made of, for example, a resin material. The micromirror array 25 has a concave reflecting surface 26 and reflects light entering from the light collecting member 23 toward the liquid crystal panel 10 by the reflecting surface 26. In the micromirror array 25, the reflecting surface 26 is composed of a plurality of micromirrors 27. In the micromirror array 25, the plurality of micromirrors 27 are arranged in a lattice pattern like a fly's eye (fly eye). As illustrated in FIG. 3, the plurality of micromirrors 27 are plurally arranged in, for example, an X direction and a Y direction orthogonal to the X direction on the reflecting surface 26. Each of the micromirrors 27 has a rectangular shape in a front view, for example. The micromirror 27 has a long side with a length x in the X direction and a short side with a length y in the Y direction. In other words, the micromirror 27 has a mirror width of the length x in the X direction and a mirror height of the length y in the Y direction. The micromirrors 27 of the present embodiment have mirror widths of an identical length in the X direction and mirror heights of an identical length in the Y direction. Each micromirror 27 may have a mirror width and a mirror height of an identical length. As illustrated in FIG. 4, the micromirror 27 is a convex curved surface. The micromirror 27 of the present embodiment is, for example, a convex partial spherical surface. The micromirror 27 has an identical curvature radius R in the X and the Y directions. That is, the micromirrors 27 each have an identical curvature 1/R in the X and the Y directions. Further, the micromirrors 27 each have an identical pitch Px in the X direction and an identical pitch Py in the Y direction. Here, the pitch P (Px, Py) is a distance between center points of two adjacent micromirrors 27. The micromirrors 27 each have an identical divergence angle ϕ in the X and the Y directions. As illustrated in FIG. 2, the divergence angle ϕ is an angle at which light 11 reflected by the micromirrors 27 spreads with respect to an optical axis. When the divergence angle ϕ increases, luminance unevenness of the backlight unit 20A is likely to occur. Therefore, it is preferred that the divergence angle ϕ be 50° or less in full width.

The polarizing plate 29 is disposed at a position to fold back an optical path between the micromirror array 25 and the liquid crystal panel 10, transmits part of the light 11 reflected by the micromirror array 25, and reflects the rest thereof toward the liquid crystal panel 10. The polarizing plate 29 is a so-called reflective polarizing plate. A reflective polarizing plate, for example, transmits linearly polarized light oscillating in one oscillating direction and reflects linearly polarized light oscillating in the other oscillating direction. The polarizing plate 29 of the present embodiment transmits the light 11 oscillating in a first direction orthogonal to an oscillating direction of light transmitted through the liquid crystal panel 10 and reflects the light 11 oscillating in a second direction intersecting the first direction. The polarizing plate 29 is made of, for example, a wire grid polarizing plate. In a wire grid polarizing plate, a metallic material is evaporated on a substrate, and a wire-like grid is formed by fine etching at a nanometer level.

The diffusing plate 30 is formed in a sheet shape or a thin plate shape and disposed on an optical path between the polarizing plate 29 and the liquid crystal panel 10. The diffusing plate 30 diffuses the light 11 reflected by the polarizing plate 29 toward the liquid crystal panel 10.

Next, operation of the backlight unit 20A according to the present embodiment will be described with reference to FIGS. 2 and 5. First, as illustrated in FIG. 2, the light 11 emitted from the light source 21 enters the light collecting member 23. The light 11 entering the light collecting member 23 is transmitted through the lens main body portion 23b and emitted from the lens surface 23a. The light 11 emitted from the lens surface 23a is collected on the micromirror array 25. The light 11 collected on the micromirror array 25 may be parallel light, divergent light, or convergent light. For example, when the light 11 entering the micromirror array 25 from the light collecting member 23 is divergent light, the light collecting member 23 can be made smaller than the micromirror array 25 and the optical path length can be shortened.

The light 11 entering the micromirror array 25 is reflected by the reflecting surface 26 toward the polarizing plate 29. It is preferred that the reflecting surface 26 of the present embodiment have a concave shape so that the light 11 entering the micromirror array 25 is collected on the liquid crystal panel 10. As illustrated in FIG. 5, the plurality of micromirrors 27 composing the reflecting surface 26 form a light source image 12 near a surface opposite to the reflecting surface 26 by the entering light 11. It is preferred that the micromirrors 27 each have a convex curved surface shape so that the liquid crystal panel 10 is irradiated with the light 11 from each light source image 12. Of the light 11 entering the polarizing plate 29, linearly polarized light in one oscillating direction is transmitted, and linearly polarized light in the other oscillating direction is reflected. That is, the light 11 oscillating in the direction (first direction) orthogonal to the oscillating direction of the light transmitted through the liquid crystal panel 10 is transmitted through the polarizing plate 29, and the light 11 oscillating in the direction (second direction) intersecting the direction is reflected toward the liquid crystal panel 10 by the polarizing plate 29. The light 11 reflected by the polarizing plate 29 is transmitted through the diffusing plate 30 and enters the liquid crystal panel 10. The light 11 entering the liquid crystal panel 10 is light oscillating in a direction coincident with the oscillating direction of the light transmitted through the liquid crystal panel 10, and therefore is suitable for light illuminating the liquid crystal panel 10. When an optical element is disposed on the optical path between the polarizing plate 29 and the liquid crystal panel 10, it is preferred that linearly polarized light reflected by the polarizing plate 29 remain unchanged before reaching the liquid crystal panel 10 by using a low birefringence resin for the optical element, or those which have little influence on polarized light such as optical glass.

As described above, the backlight unit 20A according to the present embodiment includes the light source 21, the light collecting member 23 that collects the light 11 emitted from the light source 21, the micromirror array 25 that has the concave reflecting surface 26 and reflects the light 11 entering from the light collecting member 23 toward the liquid crystal panel 10 by the reflecting surface 26, the polarizing plate 29 that is disposed at the position where the optical path between the micromirror array 25 and the liquid crystal panel 10 is folded back, transmits part of the light 11 reflected by the micromirror array 25, and reflects the rest thereof toward the liquid crystal panel 10, and the diffusing plate 30 disposed on the optical path between the polarizing plate 29 and the liquid crystal panel 10. In the micromirror array 25, the reflecting surface 26 is composed of the plurality of micromirrors 27. Each micromirror 27 is a convex curved surface. The polarizing plate 29 transmits the light 11 oscillating in the first direction orthogonal to the oscillating direction of the light transmitted through the liquid crystal panel 10 and reflects the light 11 oscillating in the second direction intersecting the first direction.

In addition, the head-up display device 1 according to the present embodiment includes the magnifying mirror 2, the liquid crystal panel 10, and the backlight unit 20A.

In the backlight unit 20A and the head-up display device 1 having the configuration above, the polarizing plate 29 is disposed at a position distant from the liquid crystal panel 10 to receive heat by light that is not transmitted through the liquid crystal panel 10. Therefore, temperature rise of the liquid crystal panel 10 can be suppressed. Due to the suppression of temperature rise, the liquid crystal panel 10 can be used for a head-up display device having a larger display angle of view.

Further, in the backlight unit 20A and the head-up display device 1 having the configuration above, for example, when a conventional reflecting mirror for folding back an optical path is replaced by the polarizing plate 29, light transmitted through the liquid crystal panel 10 reaches the liquid crystal panel 10. Therefore, light transmittance is doubled compared with the conventional reflecting mirror. As a result, although display luminance of the liquid crystal panel 10 is equivalent to that obtained by a reflecting mirror using, for example, an aluminum reflecting film, illuminance on the liquid crystal panel 10 becomes about half, which makes it possible to suppress temperature rise of the liquid crystal panel 10 due to illumination light.

In the first embodiment above, the polarizing plate 29 and the liquid crystal panel 10 are, but not limited to, disposed so that optical paths between the light collecting member 23 and the liquid crystal panel 10 do not intersect each other.

Figure 6:
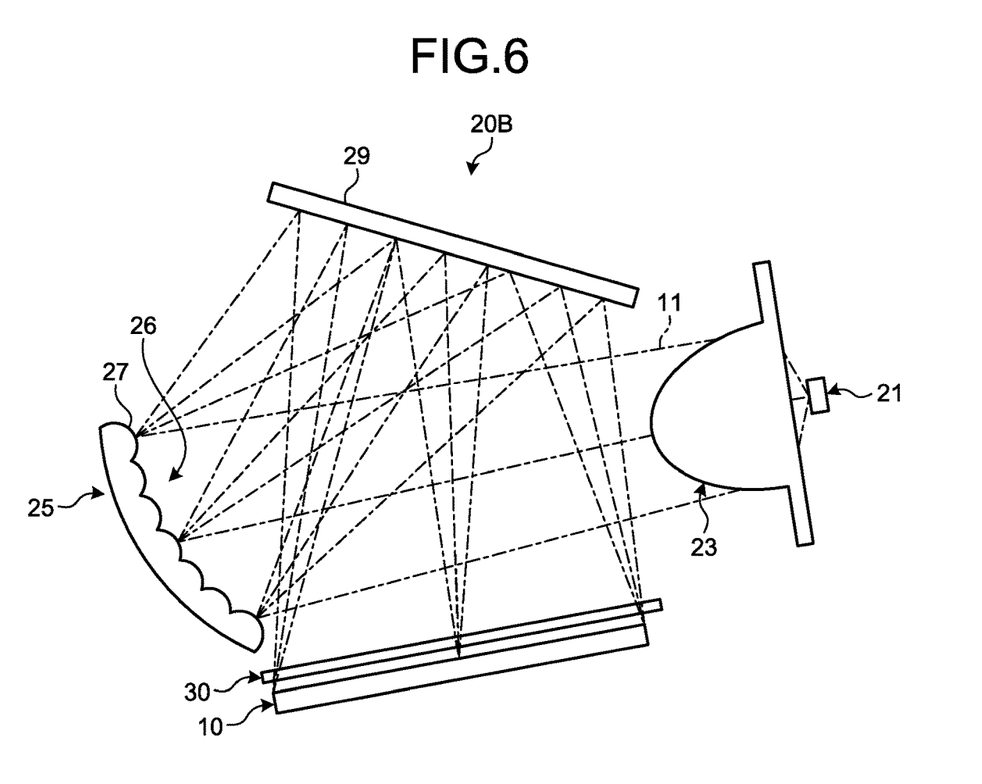
FIG. 6 is a schematic configuration diagram of a backlight unit according to a modification of the first embodiment.

FIG. 6 is a schematic configuration diagram of a backlight unit according to a modification of the first embodiment. As illustrated in FIG. 6, in a backlight unit 20B according to the modification of the first embodiment, the polarizing plate 29 and the liquid crystal panel 10 are disposed so that optical paths folded back from the polarizing plate 29 toward the liquid crystal panel 10 intersect optical paths between the light collecting member 23 and the micromirror array 25. In this way, it is possible to obtain effects similar to those of the first embodiment above, and it is possible to downsize the entire unit.

Second Embodiment

Figure 7:
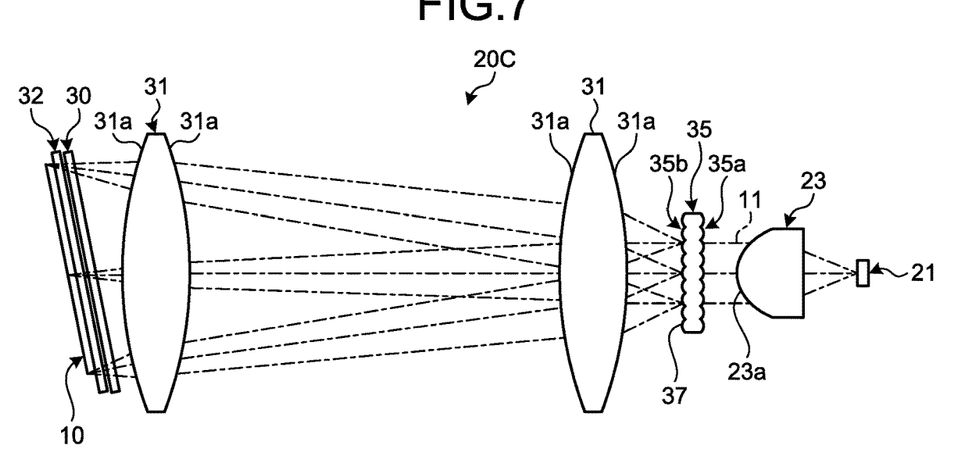
FIG. 7 is a schematic configuration diagram of a backlight unit according to a second embodiment.
Figure 8:
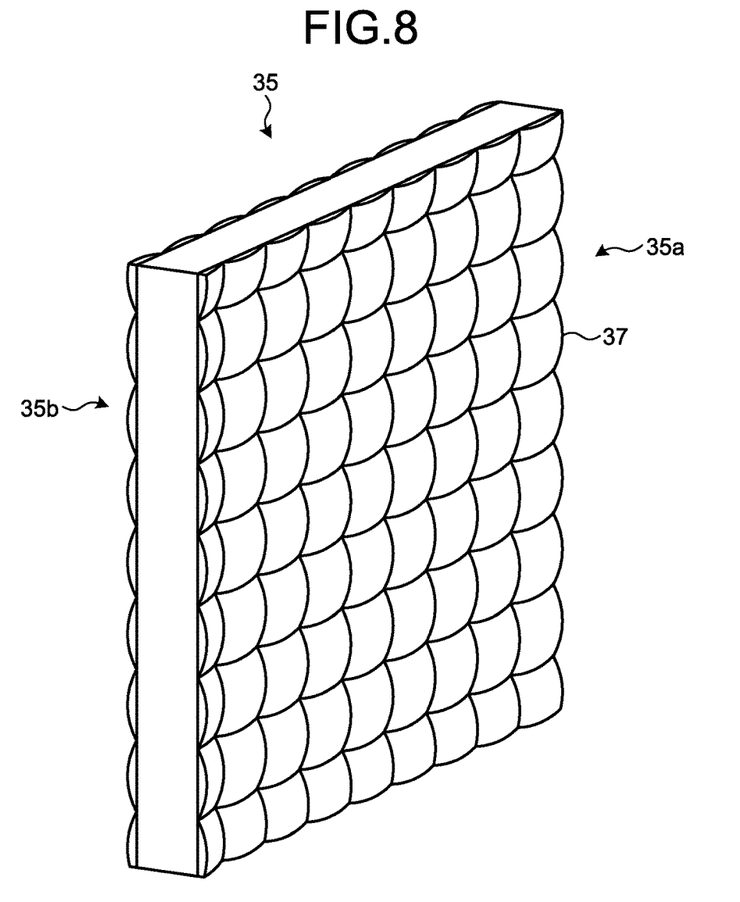
FIG. 8 is a perspective view of a microlens array according to the second embodiment.

Next, a backlight unit and the head-up display device 1 according to a second embodiment will be described. FIG. 7 is a schematic configuration diagram of the backlight unit according to the second embodiment. FIG. 8 is a perspective view of a microlens array according to the second embodiment.

A backlight unit 20C according to the second embodiment is different from the backlight unit 20A of the first embodiment above in that an optical path between the light source 21 and the liquid crystal panel 10 is not folded back. In the second embodiment, identical signs are given to components common to those of the first embodiment above and the modification, and the description thereof will be omitted.

As illustrated in FIG. 7, the backlight unit 20C includes the light source 21, the light collecting member 23, a microlens array 35, two collecting lenses 31, the diffusing plate 30, and a polarizing plate 32.

The light collecting member 23 of the present embodiment is a hemispherical collecting lens having the lens surface 23a in a hemispherical shape.

The microlens array 35 is an optical member. The microlens array 35 is made of glass or a transparent resin, for example. The microlens array 35 has an entrance surface 35a which the light 11 collected by the light collecting member 23 enters and an exit surface 35b which the light 11 entering from the entrance surface 35a exits. The microlens array 35 transmits the light 11 entering from the entrance surface 35a from the exit surface 35b toward the liquid crystal panel 10. The microlens array 35 is composed of a plurality of microlenses 37. The microlens array 35 has a so-called fly eye shaped lens surface. The plurality of microlenses 37 are arranged in a lattice pattern on the entrance surface 35a (or the exit surface 35b). As illustrated in FIG. 3, the plurality of microlenses 37 are plurally arranged in, for example, the X and the Y directions on the entrance surface 35a (or the exit surface 35b). Each microlens 37 has a convex curved surface. As illustrated in FIG. 8, the microlens 37 of the present embodiment has a convex partial spherical surface. This partial spherical surface has an identical curvature radius R, for example, in the X and the Y directions. That is, the microlens 37 has an identical curvature 1/R in the X and the Y directions.

Two collecting lenses 31 are disposed on an optical path between the microlens array 35 and the diffusing plate 30. Each of the collecting lenses 31 is made of a high refractive index material such as glass or a transparent resin and has two lens surfaces 31a. The lens surface 31a is a curved surface formed of a hemispherical surface and is formed in a direction orthogonal to an optical axis direction. The lens surfaces 31a is provided each for the entrance surface and the exit surface of the light 11.

The diffusing plate 30 of the present embodiment is disposed on an optical path between the collecting lens 31 at a latter stage of the two collecting lenses 31 and the polarizing plate 32. The diffusing plate 30 diffuses the light 11 transmitted through the collecting lens 31 at the latter stage toward the polarizing plate 32.

The polarizing plate 32 is disposed on an optical path between the microlens array 35 and the liquid crystal panel 10. The polarizing plate 32 is a so-called transmissive polarizing plate. For example, the transmissive polarizing plate transmits linearly polarized light in one oscillating direction and reflects (or absorbs) linearly polarized light in the other oscillating direction. The polarizing plate 32 of the present embodiment reflects (or absorbs) light oscillating in a direction intersecting an oscillating direction of light transmitted through the liquid crystal panel 10 and transmits light oscillating in the same direction as the oscillating direction. The polarizing plate 32 is made of, for example, a wire grid polarizing plate. A wire grid polarizing plate is a non-absorptive polarizing plate with a metallic material evaporated on a substrate and a wire-like grid formed by fine etching at a nanometer level.

Next, operation of the backlight unit 20C according to the present embodiment will be described with reference to FIG. 7. As illustrated in FIG. 7, light emitted from the light source 21 enters the light collecting member 23. The light passed through the light collecting member 23 is emitted from the lens surface 23a of the light collecting member 23. The light 11 emitted from the lens surface 23a of the light collecting member 23 is collected on the microlens array 35. The light 11 collected by the light collecting member 23 and entering the microlens array 35 needs to be parallel light.

Light entering the entrance surface 35a of the microlens array 35 is transmitted through an inside thereof and emitted from the exit surface 35b toward the collecting lens 31 at a former stage. The light transmitted through the collecting lens 31 at the former stage is transmitted through the collecting lens 31 at the latter stage to be collected on the diffusing plate 30. The light diffused on the diffusing plate 30 enters the polarizing plate 32. Of the light entering the polarizing plate 32, linearly polarized light in one oscillating direction is transmitted, and linearly polarized light in the other oscillating direction is reflected. That is, the light oscillating in the direction intersecting the oscillating direction of the light transmitted through the liquid crystal panel 10 is reflected (or absorbed) by the polarizing plate 32, and the light oscillating in the same direction as the oscillating direction is transmitted by the polarizing plate 32 toward the liquid crystal panel 10. The light 11 entering the liquid crystal panel 10 is light oscillating in a direction coincident with the oscillating direction of the light transmitted through the liquid crystal panel 10, and therefore is suitable for light illuminating the liquid crystal panel 10.

As described above, the backlight unit 20C according to the present embodiment includes one light source 21, the light collecting member 23 that collects light emitted from the light source 21, and the microlens array 35 that has the entrance surface 35a which light collected by the light collecting member 23 enters and the exit surface 35b which light entering from the entrance surface 35a exits and that transmits light entering from the entrance surface 35a from the exit surface 35b toward the liquid crystal panel 10, the polarizing plate 32 disposed on the optical path between the microlens array 35 and the liquid crystal panel 10, and the diffusing plate 30 disposed on an optical path between the polarizing plate 32 and the liquid crystal panel 10. In the microlens array 35, the entrance surface 35a and the exit surface 35b are each composed of the plurality of microlenses 37. Each microlens 37 has a convex curved surface.

The polarizing plate 32 reflects light oscillating in the direction intersecting the oscillating direction of the light transmitted through the liquid crystal panel 10 and transmits light oscillating in the same direction as the oscillating direction.

In addition, the head-up display device 1 according to the present embodiment includes the magnifying mirror 2, the liquid crystal panel 10, and the backlight unit 20C.

In the backlight unit 20C and the head-up display device 1 having the configuration above, the polarizing plate 32 reflects light that is not transmitted through the liquid crystal panel 10 and prevents the light from reaching the liquid crystal panel 10. Therefore, as in the first embodiment above, it is possible to decrease illuminance on the liquid crystal panel 10 to a half or less and suppress temperature rise thereof due to illumination light.

Further, in the backlight unit 20C and the head-up display device 1 having the configuration above, light transmitted through the liquid crystal panel 10 is transmitted through the polarizing plate 32, and therefore, as in the first embodiment above, a decrease in luminance of transmitted light can be suppressed.

In the above embodiment above, the micromirrors 27 have, but not limited to, mirror widths of an identical length in the X direction and mirror heights of an identical length in the Y direction. For example, each micromirror 27 may have a different mirror width and a different mirror height depending on its position on the reflecting surface 26. Further, the micromirrors 27 have, but not limited to, an identical pitch Px in the X direction and an identical pitch Py in the Y direction. For example, the pitches Px and Py of each micromirror 27 may be different depending on its position on the reflecting surface 26. Further, the micromirrors 27 each have, but not limited to, an identical divergence angle φ in the X and the Y directions. For example, the divergence angle φ of each micromirror 27 may be different depending on its position on the reflecting surface 26.

In the above embodiment and the modification, the light source 21 is composed of, but not limited to, one light emitting diode. The light source 21 may be, for example, a combination of a plurality of light emitting diodes. In addition, the light source 21 is not limited to a light emitting diode as long as high-luminance light is emitted.

In the above embodiment and the modification, the micromirror 27 has, but not limited to, a rectangular shape in a front view and may be a square shape, a circular shape, or a hexagonal shape. The micromirror 27 is, but not limited to, a convex curved surface and may be a concave curved surface.

Further, in the above embodiment and the modification, in the head-up display device 1, a projection target of a display image is, but not limited to, the windshield 101 and may be a combiner, for example.

In the above embodiment and the modification, the head-up display device 1 has been described in a case, but not limited to, where it is applied to a vehicle, and may be applied to those other than a vehicle such as a ship or an aircraft.

A backlight unit and a head-up display device according to the embodiment can advantageously suppress temperature rise of a liquid crystal panel due to illumination light.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A backlight unit comprising:
   at least one light source;
   a light collecting member that collects light emitted from the light source;
   an optical member that includes a concave reflecting surface and reflects light entering from the light collecting member toward a light transmissive liquid crystal display element by the reflecting surface;
   a polarizing plate that is disposed at a position where an optical path between the optical member and the liquid crystal display element is folded back, transmits part of light reflected by the optical member, and reflects the rest of the light toward the liquid crystal display element; and
   a diffusing plate disposed on an optical path between the polarizing plate and the liquid crystal display element, wherein
   the reflecting surface of the optical member includes a plurality of micromirrors,
   each of the micromirrors is a convex or a concave curved surface, and
   the polarizing plate transmits light oscillating in a first direction orthogonal to an oscillating direction of light transmitted through the liquid crystal display element and reflects light oscillating in a second direction intersecting the first direction.

2. A backlight unit comprising:
   at least one light source;
   a light collecting member that collects light emitted from the light source;
   an optical member that has an entrance surface which light collected by the light collecting member enters and an exit surface which light entering from the entrance surface exits and that transmits light entering from the entrance surface from the exit surface toward a light transmissive liquid crystal display element;
   a polarizing plate disposed on an optical path between the optical member and the liquid crystal display element; and
   a diffusing plate disposed on an optical path between the polarizing plate and the liquid crystal display element, wherein
   the entrance surface and the exit surface of the optical member each include a plurality of microlenses,
   each of the microlenses has a convex or a concave curved surface, and
   the polarizing plate reflects light oscillating in a direction intersecting an oscillating direction of light transmitted through the liquid crystal display element and transmits light oscillating in the same direction as the oscillating direction.

3. A head-up display device comprising:
   a light transmissive liquid crystal display element; and
   the backlight unit of claim 1.

4. A head-up display device comprising:
   a light transmissive liquid crystal display element; and
   the backlight unit of claim 2.

* * * * *